United States Patent [19]
Ukyo et al.

[11] Patent Number: 5,523,268
[45] Date of Patent: Jun. 4, 1996

[54] SILICON NITRIDE SINTERED BODY

[75] Inventors: Yoshio Ukyo; Toshio Kandori, both of Aichi; Shigetaka Wada, Mie, all of Japan

[73] Assignee: Kabushiki Kaisha Toyota Chuo Kenkyusho, Aichi-ken, Japan

[21] Appl. No.: 361,584

[22] Filed: Dec. 22, 1994

[30] Foreign Application Priority Data

Dec. 22, 1993 [JP] Japan .................... 5-346481

[51] Int. Cl.$^6$ .................... C04B 35/577; C04B 35/596
[52] U.S. Cl. .................... 501/92; 501/97
[58] Field of Search .................... 501/92, 91, 97

[56] References Cited

U.S. PATENT DOCUMENTS

| | | | |
|---|---|---|---|
| 4,800,182 | 1/1989 | Izaki et al. | 501/92 |
| 4,837,231 | 6/1989 | Endo et al. | 501/92 X |
| 5,178,809 | 1/1993 | Takahashi et al. | 501/92 X |
| 5,196,386 | 3/1993 | Furuse et al. | 501/92 X |
| 5,238,882 | 8/1993 | Takahashi et al. | 501/92 |

FOREIGN PATENT DOCUMENTS

| | | |
|---|---|---|
| 60-46973 | 3/1985 | Japan . |
| 5-254941 | 10/1993 | Japan . |

*Primary Examiner*—Karl Group
*Attorney, Agent, or Firm*—Oblon, Spivak, McClelland, Maier & Neustadt

[57] ABSTRACT

A silicon nitride sintered body includes silicon nitride as a principal component, silicon carbide dispersed therein and at least one of boron and boron compounds in an amount of from 0.005 to 0.5% by weight in terms of the weight of boron with respect to the total weight of the sintered body. The addition of boron or boron compounds improves the high-temperature characteristics such as creep resistance of the sintered body.

9 Claims, 1 Drawing Sheet

SILICON NITRIDE SINTERED BODY

BACKGROUND OF THE INVENTION

1. Field of the Invention

The present invention relates to a silicon nitride sintered body comprising silicon nitride as the principal component and silicon carbide dispersed therein, which is suitable for use in a structural material and the like.

2. Description of the Related Arts

A silicon nitride sintered body comprising silicon nitride (hereinafter referred to simply as "$Si_3N_4$") as the principal component is used as a structural material and the like, for example, gas turbine materials, heat exchanger materials, bearings, etc., because of its high strength and excellent thermal shock resistance and corrosion resistance.

Particularly among the examples enumerated above, materials for use at high temperatures of 1,300° C. or higher, such as gas turbine materials, require further improved high-temperature characteristics such as high strength and creep resistance at high temperatures.

Creep resistance is evaluated by the degree of progress in fracture, more specifically, by the duration until fracture and the amount of deformation of the object when an object such as a sintered body is kept with a load (stress) applied thereto. An object is evaluated as having a high creep resistance when the duration until fracture is long and the deformation until fracture (for instance, the elongation at fracture when a tension is applied) is small.

In particular, in the case that a sintered body is used as a high-temperature material in a component for an engine such as a gas turbine, a constant load (stress) is applied to the sintered body for a long duration of time at a high temperature. Accordingly, the sintered body is required to have a resistance against the applied load; that is, an improved creep resistance of the sintered body at high temperatures is required.

As a means for improving the high-temperature characteristics of a silicon nitride sintered body, it has been proposed conventionally to disperse silicon carbide (hereinafter referred to simply as "SiC") grains in the $Si_3N_4$ sintered body. A silicon nitride sintered body with improved high-temperature strength, creep resistance, and oxidation resistance can be obtained by dispersing SiC grains therein.

More specifically, a silicon nitride sintered body with superior toughness and hardness can be implemented by adding and dispersing SiC grains in the silicon nitride sintered body. In this manner, a silicon nitride sintered body with improved wear resistance can be realized. When fine SiC grains are added into a silicon nitride sintered body, they reside inside the grains of $Si_3O_4$ or in the grain boundaries. These fine SiC grains prevent grain boundary sliding from occurring, and improve the high-temperature characteristics of the silicon nitride sintered body. The fine SiC grains may be spherical grains, platelets, whiskers, long fibers, etc.

Some examples of the silicon nitride sintered body in which the fine SiC grains are dispersed are given below.

A silicon nitride sintered body with fine SiC grains dispersed therein is obtained by mixing $Si_3N_4$, SiC, and a sintering aid as the starting materials and then sintering the mixture by means of hot pressing or by encapsulated HIP (Hot Isostatic Pressing using a capsule). Another example, as disclosed in JP-A-2-160669 (the term "JP-A" as referred to herein signifies an "unexamined Japanese patent application"), provides a silicon nitride sintered body in which fine SiC grains of 1 mm or less in average diameter are dispersed in a $Si_3N_4$ matrix. The sintered body is obtained by adding a sintering aid such as $Y_2O_3$ to synthetic amorphous Si-C-N powder prepared by CVD (chemical vapor deposition) process and then sintering the mixture by hot pressing or the like.

However, the prior art silicon nitride sintered bodies containing SiC have insufficient high-temperature characteristics such as high-temperature strength. Otherwise, even though they may have good high-temperature characteristics such as a strength of, for example, 700 MPa or higher at a temperature of 1,300° C., they are manufactured only by hot pressing which results in poor productivity. For instance, the sintered body disclosed in JP-A-2-160669 referred to hereinbefore yields a maximum strength of 121 kg/mm$^2$ (as obtained by three-point bending test) at 1,200° C. However, no data for the strength at a temperature 1,300° C. or higher is available. Even though a high strength sintered body is obtained, JP-A-2-160669 discloses that the sintering process should be carried out by hot pressing. It can be seen, therefore, that the process is not feasible from a practical point of view.

Furthermore, JP-A-60-46973 discloses a sintered body of $Si_3N_4$ and SiC in which from 0.02 to 50.00 atomic percent of an oxide, such as boron oxide, is contained. The content of a boron compound in the sintered body as disclosed in Example 5 of JP-A-60-46973 is found to be 0.53% by weight in terms of the weight of boron (B). However, the addition of boron into the silicon nitride sintered body in such a large quantity results in the formation of a low-melting $B_2O_3$-based glassy phase which greatly impairs the high-temperature characteristics, particularly, the creep resistance, of the sintered body.

SUMMARY OF THE INVENTION

The present invention has been accomplished in light of the aforementioned circumstances. Accordingly, it is an object of the present invention to provide a silicon nitride sintered body having excellent high temperature characteristics such as creep resistance at high temperatures.

Thus, the present invention provides a silicon nitride sintered body comprising silicon nitride as a principal component, silicon carbide dispersed in the sintered body, and at least one selected from the group consisting of boron and boron compounds in an amount of from 0.005 to 0.5% by weight in terms of the weight of boron with respect to the total weight of the sintered body.

The silicon nitride sintered body according to the present invention has excellent high-temperature characteristics such as creep resistance at high temperatures.

These and other objects, features and advantages of the present invention will be explained in detail by preferred embodiments with reference to the attached drawing.

DETAILED DESCRIPTION OF THE INVENTION

Figure 1:
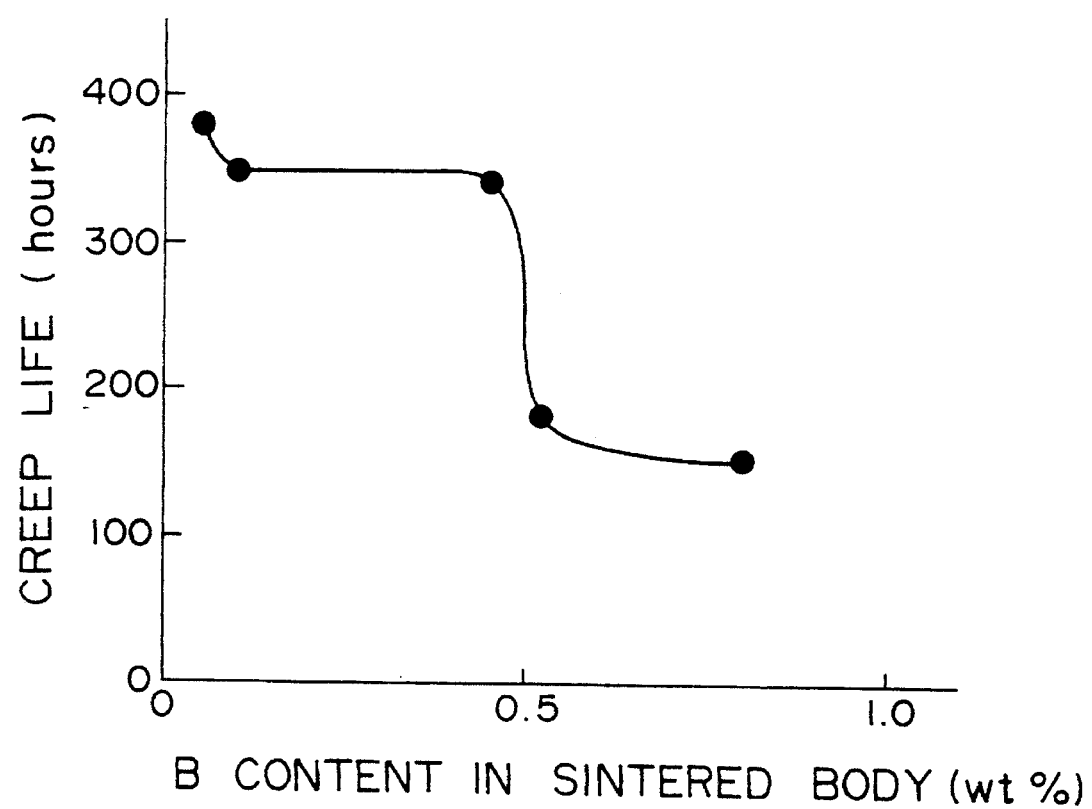
FIG. 1 is a graph showing the relation between creep life and the boron content in the silicon nitride sintered body in the Examples of the present invention and in Comparative Examples.

The silicon nitride sintered body according to the present invention comprises silicon nitride as a principal component, silicon carbide dispersed in the sintered body, and at least one selected from the group consisting of boron and boron compounds in an amount of from 0.005 to 0.5% by weight in terms of the weight of boron with respect to the total weight of the sintered body.

The silicon nitride sintered body according to the present invention has excellent high-temperature characteristics such as creep resistance at high temperatures. The reason for this superior properties of the sintered body is yet to be made clear, however, the following is assumed.

Boron or boron compounds reside as glassy phases in the grain boundary between silicon nitride ($Si_3N_4$) and silicon carbide (SiC) crystal grains constituting the sintered body. However, considering that boron and boron compounds are present in minor quantities in a range of between 0.005 and 0.5% by weight in terms of the weight of boron with respect to the total weight of the sintered body, the glassy phases remain on the surface of the silicon carbide (SiC) crystal grains to improve the wettability between the SiC and the $Si_3N_4$ crystal grains. Thus, the SiC crystal grains are allowed to be uniformly dispersed in the sintered body, and moreover, the grain growth of the $Si_3N_4$ crystal grains is suppressed to prevent abnormal grain growth from occurring. A fine-textured sintered body can be obtained in this manner.

The SiC crystal grains which remain between the $Si_3N_4$ crystal grains prevent the displacement of the $Si_3N_4$ grains from occurring when a load is applied thereto. However, the glassy phases which reside in the grain boundary will accelerate the displacement of the $Si_3N_4$ crystal grains and suppress the anchoring function of the SiC crystal grains. Further, a wider glassy phase will more accelerate the displacement. In the present invention, however, the quantity of the glassy phase is reduced to narrow the width of the glassy phase in the grain boundary, which hardly affects the anchoring function of the SiC grains.

Conclusively, the high-temperature characteristics such as creep resistance and strength at high temperatures are expected to be considerably improved in the sintered body according to the present invention.

Silicon nitride ($Si_3N_4$) constitutes the principal component, i.e., the matrix, of the sintered body. There is no particular restriction on the crystal form of the silicon nitride to be used herein, and any of a-, β-, a'-, and β'-$Si_3N_4$ crystal grains can be used. The crystal grains are preferably as fine as possible; more specifically, crystal grains being 5.0 mm or less in average diameter are preferred. This is because the absolute strength and the high-temperature strength of the resulting sintered body decrease with the increasing size of the crystal grains of $Si_3N_4$.

Silicon carbide (SiC) is present as dispersed grains in the sintered body. There is no particular restriction on the crystal form of the silicon carbide to be used herein, and crystal grains inclusive of a-, and β-SiC can be used in the sintered body. Preferably, the SiC crystal grains are to be as fine as possible; more specifically, those with an average diameter of 0.5 mm or less are desirable. If larger SiC crystal grains are incorporated into the sintered body, they would function as fracture origins, and the absolute strength of the resulting sintered body would be greatly impaired.

There is no particular restriction on the form of SiC used herein, and any form such as spherical grains, platelets, etc., can be used.

It is preferable that the content ratio by weight of $Si_3N_4$ to SiC falls in a range of from 95/5 to 1/1. If the content of SiC is lower than the preferred ratio, the high-temperature characteristics of the sintered body would not be well improved. On the contrary, if it is higher than the preferred ratio, a sufficiently dense sintered body could not be obtained.

Boron is added in the form of boron and/or boron compounds to the sintered body in an amount of from 0.005 to 0.5 % by weight in terms of the weight of boron with respect to the total weight of the sintered body. If the content of boron is lower than 0.005% by weight, a dense sintered body could not be obtained by the normal pressure sintering process. Accordingly, a sintered body with desired strength would not be obtained. The resulting sintered body can be made dense by hot pressing (HP) or by hot isostatic pressing (HIP), however, these methods result in low productivity. If the content of boron would exceed 0.5% by weight, the creep resistance would be impaired. More preferably, a sintered body with further improved creep resistance can be obtained by adding boron and/or boron compounds in a range of from 0.05 to 0.10% by weight.

Boron compounds to be added into the sintered body include any compound of boron, such as a boron oxide (e.g. $B_2O_3$), a boron carbide (e.g. $B_4C$), a boron chloride, and a boron fluoride, and at least one of the compounds is used. In case a boron oxide, e.g., $B_2O_3$, is used, the compound is considered to remain in the sintered body as a glassy phase. However, the presence of a glassy phase in the sintered body does not considerably impair the high-temperature characteristics of the sintered body so long as the phase is present in a quantity within the limited range. Moreover, since boron evaporates during the sintering process at high temperatures, the content of boron on the surface of the sintered body is lower than that inside the sintered body. It is also expected that boron undergoes a reaction with the dispersed SiC during the sintering process to form a solid solution with SiC in the sintered body.

Particularly preferred among the boron compounds mentioned above is $B_2O_3$ from the viewpoint of its low price.

The sintered body according to the present invention may further comprise sintering aids such as $Y_2O_3$ and $Al_2O_3$ that are added at the preparation of the sintered body.

The silicon nitride sintered body according to the present invention can be produced in the following manner.

Boron and/or boron compounds are added to the starting material containing silicon nitride and silicon carbide in an amount of from 0.005 to 0.5% by weight in terms of the weight of boron with respect to the weight of the sintered body. The starting material to which boron and/or the boron compounds are added is sintered thereafter.

In this manner, a silicon nitride sintered body having excellent characteristics and having a high density can be produced according to the present invention. The reason for such a result is yet to be made clear, however, the following can be assumed.

The addition of boron or a boron compound in a small quantity greatly improves the wettability between SiC and the glassy phase in the grain boundary. Furthermore, $SiO_2$ that is present in a trace amount in the starting $Si_3N_4$ material assumably undergoes a reaction with boron or a boron compound to produce a glassy phase having a low viscosity. In this manner, the sinterability is considerably improved, resulting in a dense sintered body.

The starting silicon nitride ($Si_3N_4$) material constitutes the matrix of the sintered body. There is no particular restriction on the crystal form of silicon nitride, and any of a-, β-, a'- and β'-$Si_3N_4$ crystal grains can be used. The starting silicon nitride powder preferably consists of crystal grains with an average diameter of 0.5 mm or less. If a starting powder consisting of grains with an average diameter of larger than 0.5 mm are used, the sinterability may be impaired.

Silicon carbide (SiC) is present as dispersed grains in the sintered body. There is no particular restriction concerning the crystal form of the silicon carbide to be used, and crystal grains inclusive of a- and β-SiC can be used in the sintered body according to the present invention. Preferably, the starting silicon carbide powder consists of SiC crystal grains with an average diameter of 0.5 mm or less. If SiC crystal grains with an average diameter of larger than 0.5 mm are incorporated into the sintered body, not only the sinterability would be impaired, but also the high-temperature characteristics thereof would not be improved sufficiently.

It is preferable that the content ratio by weight of $Si_3N_4$ to SiC in the sintered body falls in a range of from 95/5 to 1/1.

Boron and/or boron compounds are added to the starting material containing silicon nitride and silicon carbide in an amount of from 0.005 to 0.5% by weight in terms of the weight of boron with respect to the total weight of the sintered body. If boron content is less than 0.005% by weight, no improvement in sinterability could be expected. If boron is added in an amount in excess of 0.5% by weight, the creep resistance of the sintered body would be lowered.

Boron compounds to be added into the sintered body include any compound of boron, such as a boron oxide, a boron carbide, a boron chloride, and a boron fluoride, and at least one of the compounds is used. The most inexpensive compound among these is $B_2O_3$, and it is therefore preferred.

The starting material may contain a powder of sintering aids, such as a powder of an oxide, a nitride, etc, which are used for ordinary $Si_3O_4$ sintering. The strength at high temperatures can be greatly improved by adding $Y_2O_3$ alone. The powder of $Y_2O_3$ to be added as the sintering aid preferably consists of grains of 0.5 mm or less in average diameter. If the average diameter is larger than the preferred range, not only the sinterability would be impaired, but also the fluctuation of the characteristics would occur.

The sintering process comprising adding boron and/or boron compounds to the starting material may be carried out in the following manner.

(1) Boron and/or boron compounds are added into the powder of the starting material containing silicon nitride and silicon carbide with a sintering aid optionally added if necessary. The resulting powder is mixed, and sintered. The content of boron or of the compound thereof in the sintered body can be controlled by adjusting the quantity of boron or boron compound added into the starting material.

(2) A compact is prepared by shaping the starting material containing silicon nitride and silicon carbide with a sintering aid optionally added when necessary. The resulting compact is then buried inside a powder containing boron and/or the components selected from boron compounds, and is sintered therein.

(3) A compact is prepared by shaping a starting material containing silicon nitride and silicon carbide with a sintering aid optionally added when necessary. The resulting compact is then sintered after placing a powder containing boron and/or boron compounds around the compact (for example, a paste of the powder containing boron and/or a boron compound may be applied to the surroundings of the molding).

(4) A compact is prepared by shaping a starting material containing silicon nitride and silicon carbide with a sintering aid optionally added when necessary. Otherwise, the resulting compact is pre-sintered to prepare a pre-sintered body. The pre-sintered body or the compact is impregnated with a solution containing boron, and is dried and sintered.

In processes (2) and (3) above, boron and/or a boron compound is added into the sintered body by allowing boron and/or a boron compound to intrude into the compact from the surroundings. Thus, the content of boron and/or of a boron compound in the sintered body can be controlled by adjusting the content of boron and/or of a boron compound in the mixed powder placed around the compact. It is preferred that boron nitride (BN) not be used as the boron compound in process (2) or (3), because BN is too stable to be incorporated into the sintered body. However, an oxidized BN containing 0.0001% by weight or more of boron oxide can be used as a preferred boron compound because the boron oxide contributes to the addition of boron inside the sintered body. The powder containing at least one of boron and boron compounds includes a starting material itself containing boron or a boron compound, or a silicon nitride powder or a BN powder added with at least one of boron and boron compounds. As mentioned in the foregoing, BN powder almost free of a boron oxide does not contribute to the addition of boron into the sintered body. Thus, for example, the use of a powder mixture obtained by adding boron and/or a boron compound to a BN powder is useful for controlling the content of boron and/or of the boron compound in the resulting sintered body. The quantity of boron added into the sintered body can be controlled by adjusting the sintering conditions, e.g., the sintering temperature, the duration of sintering, etc.

Any sintering process such as pressureless sintering, gas-pressure sintering, or a combination thereof with HIP be employed. Considering the rate of production and the cost, however, preferred are pressureless sintering and gas-pressure sintering.

The sintering process is preferably conducted in the temperature range of from 1,750° to 2,000° C., and more preferably, in the temperature range of from 1,800° to 1,900° C. The duration of sintering is preferably from 1 to 8 hours, and more preferably, from 2 to 4 hours. The sintering process is preferably performed in an atmosphere of gaseous nitrogen or an inert gas atmosphere.

The silicon nitride sintered body according to the present invention has excellent high-temperature characteristics, and is therefore suitable for use as high temperature structural materials and the like of automobile engines, gas turbines, etc.

The present invention is described in further detail below with reference to the following examples.

EXAMPLE 1

A powder blend was prepared by adding 0.1% or 0.5% by weight of $B_2O_3$ in terms of the weight of B with respect to the total weight of the sintered body to a mixed powder of $Si_3N_4$ powder, 30% by weight of SiC powder and 8% by weight of $Y_2O_3$ as a sintering aid. The total weight of the powder mixture is taken as 100% throughout the Examples hereinafter. The resulting powders with different $B_2O_3$ contents were shaped and sintered at 1,850° C. in gaseous $N_2$ for a duration of 4 hours.

For comparison, sintered bodies containing boron in an amount not within the limited range of from 0.005 to 0.5% by weight in terms of the weight of B with respect to the total weight of the sintered body were prepared by adding $B_2O_3$ in the same manner as above as Comparative Examples.

The sintered bodies thus obtained were subjected to chemical analyses to obtain the boron content. Furthermore, the density as well as the four-point bending strength at room temperature and at 1,400° C. were measured for each of the sintered body. The results are summarized in Table 1.

of high-temperature strength. Although no $B_2O_3$ was added into the BN powder, a content of 0.001% and 0.002% by weight of B was detected on Sample Nos. C5 and C6 of the Comparative Example. The boron detected on the sintered bodies of the Comparative Example Nos. C5 and C6 is

TABLE 1

| Sample Nos. | | Boron Content in Sintered Body (wt. %) | Density (g/cm³) | 4-point Bending Strength (MPa) | |
|---|---|---|---|---|---|
| | | | | Room Temperature | 1,400° C. |
| Examples | 1 | 0.090 | 3.27 | 720 | 690 |
| | 2 | 0.083 | 3.27 | 720 | 660 |
| | 3 | 0.450 | 3.29 | 730 | 675 |
| | 4 | 0.471 | 3.29 | 750 | 720 |
| | 5 | 0.480 | 3.30 | 760 | 755 |
| Comparative | C1 | 0.001 | 3.10 | 590 | 485 |
| Examples | C2 | 0.003 | 3.12 | 552 | 460 |
| | C3 | 2.920 | 3.33 | 690 | 510 |
| | C4 | 3.100 | 3.33 | 700 | 500 |

It can be seen from Table 1 that the sintered bodies according to Example 1 of the present invention yield excellent bending strength as compared with that of the Comparative Examples, and that they are particularly improved in terms of high-temperature strength.

EXAMPLE 2

A compact was produced by shaping a mixed powder of $Si_3N_4$, 30% by weight of SiC powder and 8% by weight of $Y_2O_3$ as a sintering aid. The resulting compact was buried into a BN powder added with 0.1% or 0.5% by weight of $B_2O_3$ in terms of the weight of boron with respect to the total weight of the sintered body, and sintered at 1,850° C. for 6 hours in gaseous $N_2$.

For comparison, sintered bodies were prepared in the same manner as above as Comparative Examples, except that the compact was buried in BN powder free of $B_2O_3$ or BN powder containing $B_2O_3$ in an amount of 3% by weight in terms of the weight of boron with respect to the total weight of the sintered body.

The sintered bodies thus obtained were subjected to chemical analyses to obtain the boron content. Furthermore, the density as well as the four-point bending strength at room temperature and at 1,400° C. were measured for each of the sintered bodies in the same manner as in Example 1. The results are summarized in Table 2.

presumably attributed to the oxide layer of $B_2O_3$ present on the surface of the commercially available BN powder.

EXAMPLE 3

The compact was prepared in the same manner as in Example 2. The compact was each surrounded by BN powder containing $B_2O_3$ in an amount of 0.1% or 0.4% by weight in terms of the weight of boron with respect to the total weight of the sintered body, and was sintered at 1,850° C. for 6 hours under gaseous $N_2$.

For comparison, sintered bodies were prepared in the same manner as above in Comparative Examples, except that BN powder free of $B_2O_3$ or BN powder containing $B_2O_3$ in an amount of 3% by weight in terms of the weight of boron with respect to the total weight of the sintered body was placed around the compact.

The sintered bodies thus obtained were subjected to chemical analyses to obtain the boron content. Furthermore, the density as well as the four-point bending strength at room temperature and at 1,400° C. were measured for each of the sintered bodies in the same manner as in Example 1. The results are summarized in Table 3

TABLE 2

| Sample Nos. | | Boron Content in Sintered Body (wt. %) | Density (g/cm³) | 4-point Bending Strength (MPa) | |
|---|---|---|---|---|---|
| | | | | Room Temperature | 1,400° C. |
| Examples | 6 | 0.120 | 3.28 | 710 | 695 |
| | 7 | 0.115 | 3.27 | 715 | 700 |
| | 8 | 0.495 | 3.30 | 758 | 738 |
| Comparative | C5 | 0.001 | 3.10 | 570 | 460 |
| Examples | C6 | 0.002 | 3.11 | 550 | 435 |
| | C7 | 3.100 | 3.33 | 680 | 510 |
| | C8 | 3.105 | 3.32 | 690 | 500 |

Table 2 clearly indicates that the sintered bodies according to Example 2 of the present invention yield excellent bending strength as compared with that of the Comparative Examples, and that they are particularly improved in terms

TABLE 3

| Sample Nos. | | Boron Content in Sintered Body (wt. %) | Density (g/cm³) | 4-point Bending Strength (MPa) | |
|---|---|---|---|---|---|
| | | | | Room Temperature | 1,400° C. |
| Examples | 9 | 0.100 | 3.27 | 715 | 700 |
| | 10 | 0.105 | 3.27 | 723 | 705 |
| | 11 | 0.431 | 3.29 | 765 | 725 |
| | 12 | 0.417 | 3.29 | 770 | 730 |
| | 13 | 0.422 | 3.30 | 773 | 735 |
| Comparative Examples | C9 | 0.002 | 3.09 | 593 | 490 |
| | C10 | 0.001 | 3.10 | 565 | 472 |
| | C11 | 2.582 | 3.33 | 670 | 562 |
| | C12 | 2.730 | 3.33 | 693 | 530 |

Table 3 clearly indicates that the sintered bodies according to Example 3 of the present invention yield excellent bending strength as compared with that of the Comparative Examples, and that they are particularly improved in terms of high-temperature strength.

EXAMPLE 4

Sintered bodies were prepared in the same manner as in Example 1. $B_2O_3$ was added in an amount of 0.05%, 0.10%, and 0.45% by weight in terms of the weight of boron with respect to the total weight of the sintered body. For comparison, two types of sintered bodies each containing boron in excess of 0.5 % by weight in terms of the weight of boron with respect to the total weight of the sintered body were prepared in the same manner as above by adding $B_2O_3$.

The sintered bodies thus obtained were subjected to chemical analyses to obtain the boron content. Furthermore, the samples were each machined into test pieces having a diameter of 3 mm at the portion to which stress was applied, so that they could be subjected to a tensile creep test. The test pieces thus obtained were then subjected to the creep test by applying a stress of 200 MPa at 1,400° C. in air. The results are summarized in Table 4. The time until fracture (creep life) and elongation (%) at fracture are also given in Table 4.

TABLE 4

| Sample Nos. | | Boron Content in Sintered Body (wt. %) | Creep Life (hours) | Elongation at Fracture (%) |
|---|---|---|---|---|
| Examples | 14 | 0.05 | 380 | 1.30 |
| | 15 | 0.10 | 350 | 1.40 |
| | 16 | 0.45 | 343 | 1.30 |
| Comparative Examples | C13 | 0.52 | 185 | 1.90 |
| | C14 | 0.80 | 155 | 1.91 |

The relation between the creep life and the boron content in the sintered body as summarized in Table 4 is shown graphically in FIG. 1.

Table 4 and FIG. 1 clearly indicate that the sintered bodies of Example 4 according to the present invention yield superior creep resistance at high temperatures (i.e. longer creep life) and a smaller elongation to fracture as compared to those of the Comparative Examples.

What is claimed is:

1. A silicon nitride sintered body comprising silicon nitride as a principal component, silicon carbide dispersed in the sintered body and at least one member selected from the group consisting of boron and boron compounds in an amount of from 0.005 to 0.5% by weight in terms of the weight of boron with respect to the total weight of said sintered body.

2. A silicon nitride sintered body as claimed in claim 1, wherein said at least one member is included in an amount of from 0.05% to 0.10% by weight in terms of the weight of boron.

3. A silicon nitride sintered body as claimed in claim 1, wherein said boron compound is at least one selected from the group consisting of a boron oxide, a boron carbide, a boron chloride, and a boron fluoride.

4. A silicon nitride sintered body as claimed in claim 3, wherein said boron oxide is $B_2O_3$.

5. A silicon nitride sintered body as claimed in claim 1, wherein said silicon nitride has an average crystal grain diameter of 5.0 mm or less in the sintered body.

6. A silicon nitride sintered body as claimed in claim 1, wherein said silicon carbide has an average crystal grain diameter of 0.5 mm or less in the sintered body.

7. A silicon nitride sintered body as claimed in claim 1, wherein the content ratio by weight of said silicon nitride to said silicon carbide ranges from 95/5 to 1/1.

8. A silicon nitride sintered body as claimed in claim 1, further comprising a sintering aid.

9. A silicon nitride sintered body as claimed in claim 8, wherein said sintering aid is $Y_2O_3$.

* * * * *